United States Patent
Kwag et al.

(10) Patent No.: US 7,151,146 B1
(45) Date of Patent: Dec. 19, 2006

(54) NEODYMIUM-CARBON NANOTUBE AND METHOD OF PREPARING HIGH 1,4-CIS-POLYBUTADIENE USING THE SAME

(75) Inventors: Gwanghoon Kwag, Daejeon (KR); Pilsung Kim, Daejeon (KR); Shin Han, Daejeon (KR); Hyung Kyu Choi, Daejeon (KR); Dong Hwan Kim, Daejeon (KR); Seung Hwa Lee, Daejeon (KR); Sung Hoon Han, Daejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 0 days.

(21) Appl. No.: 11/315,322

(22) Filed: Dec. 23, 2005

(30) Foreign Application Priority Data

Sep. 8, 2005 (KR) .................. 10-2005-0083836

(51) Int. Cl.
*C08F 4/52* (2006.01)
*C08F 36/02* (2006.01)

(52) U.S. Cl. ............. 526/152; 526/153; 526/164; 526/908; 502/114; 502/115; 502/117; 534/16; 423/445 R; 423/445 B; 977/746; 977/748

(58) Field of Classification Search .......... 534/16; 423/445 B, 445 R; 977/746, 748; 526/164, 526/152, 153, 908; 502/114, 115, 117, 182
See application file for complete search history.

(56) References Cited

U.S. PATENT DOCUMENTS

| 4,260,707 A |   | 4/1981  | Sylvester et al. |
|-------------|---|---------|------------------|
| 5,017,539 A |   | 5/1991  | Jenkins et al.   |
| 5,360,898 A |   | 11/1994 | Jordaan et al.   |
| 5,428,199 A |   | 6/1995  | Berger et al.    |
| 5,449,387 A |   | 9/1995  | Hawkins et al.   |
| 5,869,626 A | * | 2/1999  | Yamamoto et al. .......... 534/10 |
| 6,203,814 B1 | * | 3/2001  | Fisher et al. ............. 424/443 |
| 6,780,948 B1 | * | 8/2004  | Rachita et al. ............ 526/164 |

FOREIGN PATENT DOCUMENTS

| EP | 0 011 184 | 5/1980 |
| EP | 0 512 346 A2 | 11/1992 |
| EP | 0 599 096 A1 | 6/1994 |
| GB | 2 140 435 | 11/1984 |
| KR | 1020000032230 A | 6/2000 |
| WO | WO/97/36850 | 10/1997 |
| WO | WO98/39283 | 11/1998 |
| WO | 2004/046031 | * 6/2004 |

OTHER PUBLICATIONS

Jenkins, "Butadiene Polymerization with a Rare Earth Compound Using a Magnesium Alkyl Cocatalyst: 1", POLYMER, vol. 26, pp. 147-151 (Jan. 1985).
Poncelet, O., et al., "Reactivity of Neo9dymium(III) Isopropoxide Derivatives: Synthesis Characterization and Crystal Structure . . . ", Polyhedron, vol. 8, No. 17, pp. 2183-2188 (1989).
Han, J.H., "Current Status on Synthesis of Carbon Nanotubes and their Applications to Conducting Polymer", Polymer Science and Technology, vol. 16, No. 2, pp. 162-175 (2005).
Min, B.G., "R&D Trend of CNT/Polymer Nanocomposites", Polymer Science and Technology, vol. 16, No. 2, pp. 176-188, (2005).
Serpaggi, F., et al., "Hybrid Open Frameworks (MIL-n. Part 4 Synthesis and Crystal Structure of MIL-8, a series of lanthanide glutarates with an open framework . . . ", J. Mater. Chem. vol. 8, pp. 2737-2741 (1998).
Lourie, O., et al., "Evaluation of Young's Modulus of Carbon Nanotubes by Micro-Raman Spectroscopy", J. Mater. Res., vol. 13, No. 9, pp. 2418-2422 (1998).

* cited by examiner

*Primary Examiner*—Fred Teskin
(74) *Attorney, Agent, or Firm*—Whitham, Curtis, Christofferson & Cook, PC

(57) ABSTRACT

The present invention relates to a method for preparing neodymium-carbon-nanotube and a process for preparing 1,4-cis-polybutadiene utilizing the same and more particularly, neodymium-carbon-nanotube. Neodymium is introduced by coordination with carboxylic acid, which is formed on the surface of carbon nanotube. In 1,3-butadiene polymerization with the neodymium-catalyst comprising the neodymium-carbon nanotube, a particular halogen compound, and a particular organometallic compound in an appropriate ratio, high 1,4-cis polybutadiene having molecular weight of 10,000 to 2,000,000 is produced, which exhibits excellent mechanical properties such as elasticity and durability.

6 Claims, 9 Drawing Sheets

NEODYMIUM-CARBON NANOTUBE AND METHOD OF PREPARING HIGH 1,4-CIS-POLYBUTADIENE USING THE SAME

CROSS REFERENCE TO RELATED APPLICATION

This application is based on, and claims priority to Koreand Patent Application No. 10-2005-0083836 filed on Sep. 8, 2005, the disclosure to which is hereby incorporated by reference.

TECHNICAL FIELD OF THE INVENTION

The present invention relates to neodymium-carbon nanotube, and more particularly to a method of preparing high 1,4-cis-polybutadiene utilizing the same. In the present invention, neodymium is introduced onto the surface of carbon nanotube thereby producing neodymium-carbon nanotube, which is in turn used to produce polybutadiene with more than 95% content of 1,4-cis and a molecular weight of 10,000 to 2,000,000, having excellent mechanical properties such as elasticity and durability, by using a catalyst comprising the neodymium-carbon nanotube, a particular halogen compound, and a particular organometallic compound in an appropriate ratio.

BACKGROUND OF THE INVENTION

Generally, carbon nanotube (carbon nanotube; CNT) is formed from hexagonal arrays of carbon atoms with a $sp^2$ bond and a structure thereof is a honeycomb-shaped network of graphite sheet rolled into a cylindrical shape or tube. Carbon nanotube has a diameter of from a few □ to a few tens of nanometers (nm) and its length ranges from several tens to several thousands times greater than that of its diameter.

Such carbon nanotube has a structure of a graphite sheet rolled into cylindrical shape and the properties of carbon nanotube vary greatly depending on its structure and size. It has ultimate high strength of 5Tpa, which is greater than those of metals [J. Mater. Res. 1998, 13(9), 2418]. Further, it can exhibit the properties of insulators, semiconductors, or metals according to its structure and diameter, factors which are known to change electrical properties.

Since graphite sheets helically coil around nanotube to form carbon nanotube, electron movements are also changed to form an armchair or a zig-zag patterned structure when the direction of the helix is changed.

There are two main types in carbon nanotubes: single-walled nanotube (SWNT) and multi-walled nanotube (MWNT). In tire industry, it is expected that carbon nanotube would replace carbon black since the composite surface is much softer than that of carbon black or carbon fiber and it rarely loses fragments. Especially, more than 80% of silica cannot be filled due to static electricity in manufacturing tires but more than 95% of silica can be filled when carbon nanotube is used [Polymer Science and Technology 2005, 16(2), 162]. It is also disclosed that a composite of carbon nanotube and polystyrene enhances more than 40% of elasticity and tensile strength with only 1% amount [Polymer Science and Technology 2005, 16(2), 176].

There are methods for improving dispersion and interfacial property with matrix via physical treatment utilizing non-covalent bonds and inducing covalent bond by chemical modification of carbon materials.

When lanthanum series metals, i.e., metals from atomic number 57 of lanthanum to 71 of lutetium, are used as a catalyst in the preparation of polybutadiene via 1,3-butadiene polymerization, it provides polybutadiene with relatively higher 1,4-cis content as compared with those of transition metals such as nickel, titanium and cobalt. Of lanthanum metals, cerium, lanthanum, neodymium, and gadolinium show better catalytic activities, and neodymium the best.

In WO 97/36850, WO 98/39283, UK Pat. No. 2,140,435, EP Pat. Nos. 512,346 and 599,096, U.S. Pat. Nos. 5,428,199, 5,449,387, and 5,360,898, and Polymer (1985, vol 26, p 147), there are disclosed methods of preparing polybutadiene by using lanthanide catalyst, prepared with lanthanide chloride, lanthanide nitrate, lanthanide oxide or neodymium carboxylate. Of the lanthanide compounds, neodymium carboxylate is most effective.

Such active rare earth catalysts are generally prepared from a neodymium compound, an organoaluminum and a halogen compound.

However, the catalytic activity of neodymium obtained by the above methods is no more than 7%, and the low activity usually results in forming a gel. Especially, it is difficult to remove the salts such as nitrates, chloride, and sulfates contained in the neodymium compound. Further, solvents including water, alcohol, ether, dimethyl formamide and the like used in the preparation of neodymium compounds coordinate with neodymium, which thereby accelerates coagulation and reduces the efficiency of the catalyst [Polyhedron 1989, 8(17), p 2183; J. Mater. Chem. 1998, 8, p 2737].

EP Pat. No. 11184 and U.S. Pat. Nos. 4,260,707 and 5,017,539 dislcose methods for preparing high 1,4-cis polybutadiene by using neodymium carboxylate, for example, the preparation of high 1,4-cis polybutadiene by using a catalyst comprising neodymium carboxylate, alkyl aluminum compound, and Lewis acid in the presence of a non-polar solvent.

SUMMARY OF THE INVENTION

The present invention relates to a method for preparing high 1,4-cis polybutadiene by using a novel neodymium-carbon nanotube catalyst. The inventors of the present invention, after extensive experimental efforts, have found a method for preparing high 1,4-cis polybutadiene having a molecular weight of 10,000 to 2,000,000 with excellent mechanical properties such as elasticity and durability, by using neodymium-carbon nanotube, which is produced by introducing neodymium via an exchange with carboxylic acid to be formed on the surface of carbon nanotube, in the presence of a catalyst comprising neodymium-carbon nanotube.

In an aspect, therefore, the present invention relates to neodymium-carbon nanotube.

In another aspect, the present invention relates to a catalyst comprising the neodymium-carbon nanotube.

In still another aspect, the present invention n relates to a process for preparing high 1,4-cis polybutadiene using the above catalyst, which exhibits improved elasticity and durability.

BRIEF DESCRIPTION OF DRAWINGS

The above and other objects, features and advantages of the present invention will be apparent from the following detailed description of the preferred embodiments of the invention in conjunction with the accompanying drawings, in which.

DTAILED DESCRIPTION OF THE INVENTION

Figure 1:
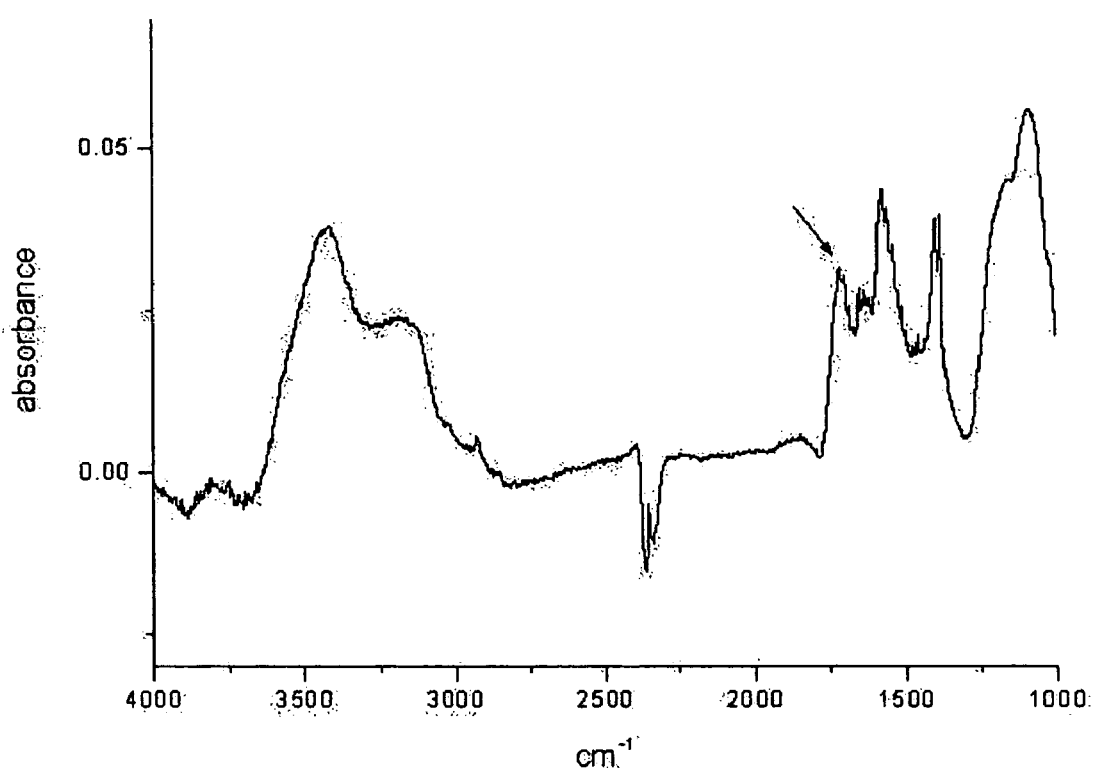
FIG. 1 is Infrared absorption spectrum of carboxylated-carbon nanotube prepared in Preparation Example 1 of the invention.
Figure 2:
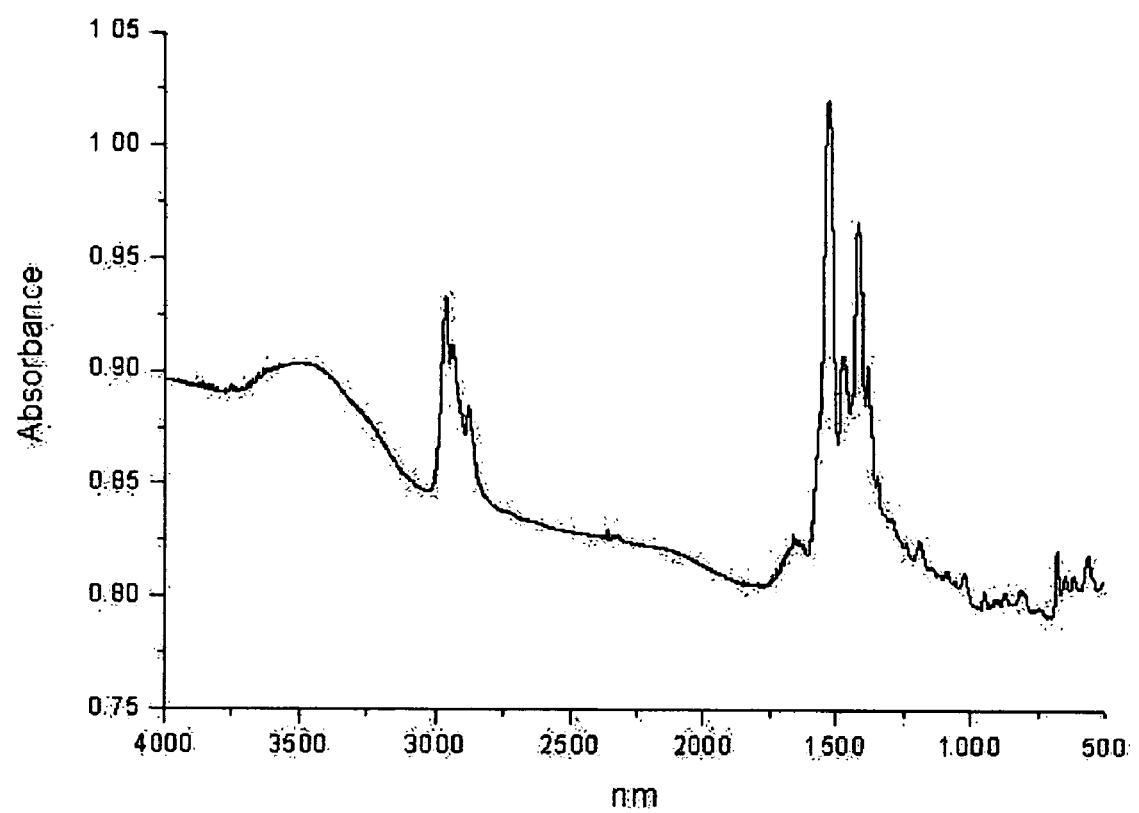
FIG. 2 is Infrared absorption spectrum of neodymium-carbon nanotube prepared in Preparation Example 1 of the invention.
Figure 3:
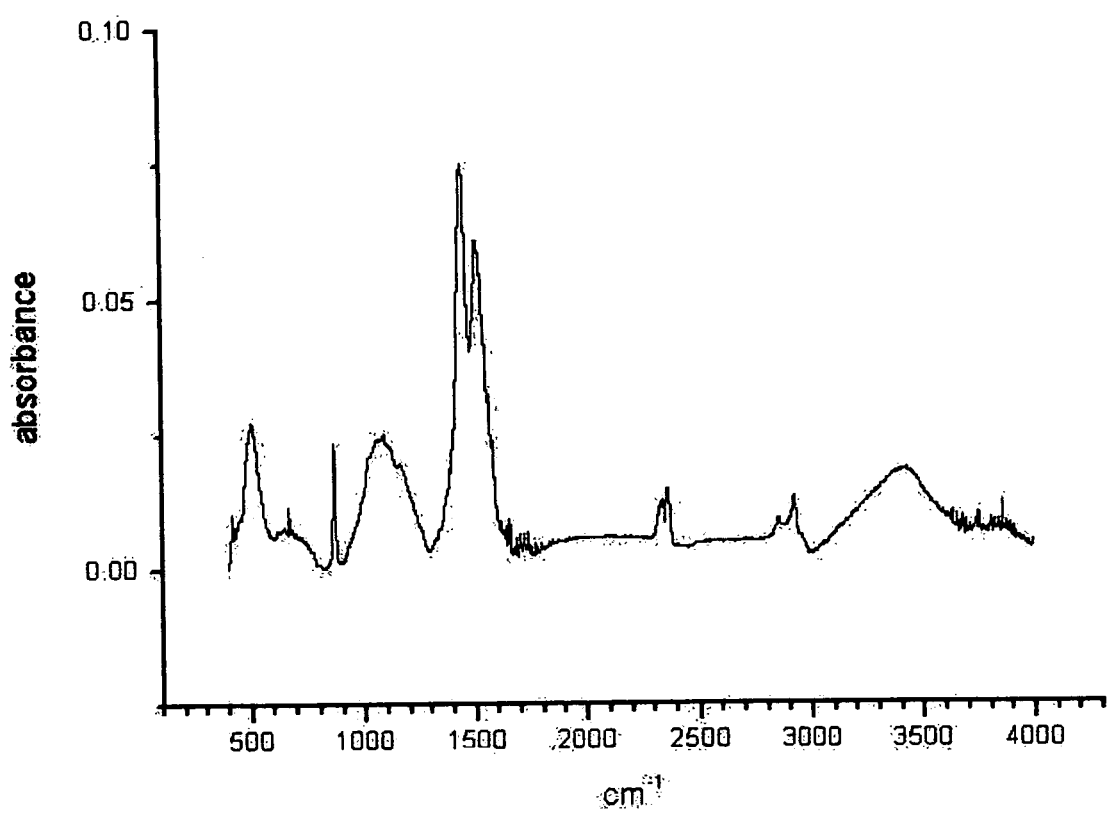
FIG. 3 is Infrared absorption spectrum of carboxylated-carbon nanotube prepared in Preparation Example 4 of the invention.

The present invention relates to preparation of neodymium-carbon nanotube expressed by the following formula 1, $$Nd_x(CNT)(A)_y \cdot (HA)_q \qquad (1)$$

wherein A is carboxylate having 8 to 20 carbon atoms, HA is carboxylic acid, CNT is carbon nanotube, y=3x, and $0 \leq q/x \leq 10$.

Neodymium-carbon nanotube is prepared by a ligand-exchange reaction with a neodymium compound and carboxylated carbon nanotube (CNT). The carboxylated CNT is prepared by forming carboxylic acid on the surface of carbon nanotube via the oxidation reaction of the carbon nanotube. Although not limited, it is preferred that carbon nanotube of the present invention has a length of 10–1000 nm, an outer diameter of 1–50 nm and single or multi walls.

Many oxidation methods of carbon nanotube can be used by using hydrogen peroxide, nitric acid, and a mixture of sulfuric acid and nitric acid or using anion and carbon dioxide. The carboxylated CNT prepared by using an acid solution is shown excellent in effect in the present invention. Carboxylate is needed in the present invention because it is a good ligand to coordinate with rare earth metals. The carboxylic acid used in the present invention is a saturated, an unsaturated, a ring, or a linear structure having 8 to 20 carbon atoms, particularly, octanoic acid, naphthenic acid, versatic acid, stearic acid, and the like.

In addition, neodymium compounds are not limited to certain compounds, but it can be any typical compound used in the art. It is preferred to have good solubility and to be ligand-exchangeable, for example, with neodymium acetate, neodymium nitrate, neodymium sulfate, neodymium chloride, etc.

During the ligand exchange reaction, another rare earth metal such as cerium, lanthanum, gadolinium, or the like can be used additionally since it turns to $Nd^{+3}$ so that other ligand bonds other than carbon nanotube are possible when neodymium is oxidized.

In an embodiment of the present invention, there is provided a diene polymerizable catalyst comprising a neodymium-carbon nanotube expressed by formula 1, a halogen compound expressed by the following formula 2, and an organometallic compound expressed by the following formula 3, $$(R_1)_n AlX_{3-n} \qquad (2)$$

wherein $R_1$ is an alkyl, aryl having 1 to 10 carbon atoms or a hydrogen, X is a halogen, and n is an integer of 1 or 2:

$$M(R_2)_r \qquad (3)$$

wherein $R_2$ is an alkyl, cycloalkyl, aryl, arylalkyl, alkoxy of from 1 to 10 carbon atoms or a hydrogen, M is a metal atom selected from Al, Mg, and Li, and $1 \leq r \leq 3$.

In Korean Pat. No. 10-295600, the inventors of the present invention have already disclosed a method for preparing high 1,4-cis polybutadiene by using a neodymium compound, an organotin halide compound, an organoaluminum compound, and a conjugated diene compound in the presence of an aged catalyst.

In another embodiment of the present invention, there is provided a catalyst for diene polymers comprising an appropriate mixing ratio of neodymium-carbon nanotube, a halogen compound of Lewis acid, and an organometallic compound. The neodymium functions as a catalyst and the carbon nanotube improves elasticity and tensile strength under dispersion. Such effects cannot be attained from a simple mixing of neodymium and carbon nanotube since it is impossible to obtain a homogenous dispersion of carbon nanotube in rubber matrix or in polymer solution. In the present invention, neodymium is bonded on the surface of the carbon nanotube and polymer grows at the end of the bonded catalyst so that it exhibits a homogeneous dispersion.

Here, aluminum is preferable as the organometallic compound, particularly trimethyl aluminum, triethyl aluminum, tripropyl aluminum, tributyl aluminum, triisobutyl aluminum, trihexyl aluminum, diisobutyl aluminum hydride, and the like.

The halogen atom is used in the amount of from 1 to 10 mole ratio based on the amount of neodymium atom. If the halogen atom is used less than 1 mole ratio, the reaction is hardly initiated. In contrast, if it is used more than 10 mole ratio, it results in gel formation.

The organometallic compound is used in the amount of from 10 to 200 mole ratio based on the amount of neodymium atom. If the organometallic compound is used less than 10 mole ratio, the reaction is hardly initiated. In contrast, if it is used more than 200 mole ratio, it becomes difficult to control the reaction rate.

In a further embodiment of the present invention, there is provided a method for preparing high 1,4-cis polybutadiene in the presence of a nonpolar solvent utilizing the neodymium CNT catalyst described above.

The diene compound used in the present invention is the one commonly used in the art and has a conjugated bond, in particular, 1,3-butadiene, isoprene, 1,3-pentadiene, 2,3-dimethyl-1,3-butadiene, myrcene, and the like.

Further, it is preferable to use a non-polar solvent which does not react with a catalyst. Examples of these non-polar solvents include aliphatic hydrocarbons such as butane, pentane, hexane, isopentane, heptane, octane, isooctane, and the like, cycloaliphatic hydrocarbons such as cyclopentane, methyl cyclopentane, cyclohexane, methyl cyclohexane, ethyl cyclohexane, and the like, and aromatic hydrocarbons such as benzene, toluene, ethylbenzene, xylene, and the like.

The non-polar solvent, which affects the polymerization significantly, is purged $N_2$ to remove oxygen and moisture, and then used in the range of from 300 to 1000 wt % based on the amount of butadiene.

If the non-polar solvent is used less than 300 wt %, solution viscosity becomes too high. In contrast, if it is used more than 1000 wt %, the reaction rate becomes too slow. Therefore, it is preferable that the solvent be used within the above range.

It is preferred that the diene polymerization be performed at a temperature of −20 to 100 □ for 30 min to 3 hours. After the reaction is completed, 2,6-di-tert-butyl-4-methylphenol as antioxidant is added and methyl alcohol or ethyl alcohol is added to precipitate the product.

The high 1,4-cis content polybutadiene prepared via the method described above has a molecular weight of 10,000 to 2,000,000.

Now, the present invention will be described in further detail by way of the following examples, which are not intended to limit the scope of the present invention.

PREPARATION EXAMPLE

Preparation of Neodymium-Carbon Nanotube

Preparation Example 1

Nitric acid (20 mL) was added to carbon nanotube (1.5 g) and the mixture was reacted at room temperature for 5 hours, and then the adduct obtained by filtration was washed with water and acetone, and then dried.

The formation of the carboxylic acid group on the carboxylated carbon nanotube was identified by Infrared Spectral Analysis as shown in Table 1: $\upsilon_{OH}$=3420, 3175 cm$^{-1}$ and $\upsilon_{C=O}$=1719 cm$^{-1}$.

Dried carboxylated-carbon-nanotube (1.5 g) was dispersed into 50 mL of chlorobenzene and 1.5 g of neodymium acetate was added thereto. The reaction mixture was refluxed while stirring. Acetic acid and water produced during the reaction were removed using a Dean-stark trap. The solvent chlorobenzene was removed to produce neodymium-carbon nanotube.

The formation of the neodymium-carboxylated-CNT was identified by Infrared Spectral Analysis as shown in Table 2: $\upsilon$(cm$^{-1}$)=1690.

Preparation Example 2

Carbon nanotube (1.5 g) was dispersed into 500 mL of water and 200 mL of 20% hydrogen peroxide was added thereto and the mixture was reacted at room temperature for 24 hours. The adduct was obtained by filtration and washed with water and acetone, and dried.

The formation of carboxylate of the carboxylated-carbon-nanotube was identified by Infrared Spectral Analysis.

Dried carboxylic acid-carbon nanotube (1.5 g) was dispersed into 500 mL of chlorobenzene and 1.5 g of neodymium acetate was added thereto. The reaction mixture was refluxed while stirring. Acetic acid and water produced during the reaction were removed using a Dean-stark apparatus. Chlorobenzene was removed to produce neodymium-carbon nanotube.

The formation of the neodymium-carboxylated CNT was identified by Infrared Spectral Analysis: $\upsilon$(cm$^{-1}$)=1690.

Preparation Example 3

Carbon nanotube (1.5 g) was added in 200 mL of a mixture of sulfuric acid and nitric acid (3:1, wt/wt) and the mixture was refluxed for 3 hours. The adduct was obtained by filtration, and washed with water and acetone, and then dried.

The formation of the carboxylic acid group of the carboxylated-carbon nanotube was identified by Infrared Spectral Analysis.

Dried carboxylated-carbon-nanotube (1.5 g) was dispersed into 500 mL of chlorobenzene and 1.5 g of neodymium acetate was added thereto. The reaction mixture was refluxed while stirring. Acetic acid and water produced during the reaction were removed using a Dean-stark apparatus. The solvent chlorobenzene was removed to produce neodymium-carbon nanotube.

The formation of the neodymium of the product was identified by Infrared Spectral Analysis: $\upsilon$(cm$^{-1}$)=1690.

Preparation Example 4

Dried carbon nanotube (10 g) was dispersed in anhydrous cyclohexane by means of ultrasonic waves and 60 mL of 1.2 M butyllithium was slowly added thereto. The mixture was reacted at room temperature for 2 hours and 5 g of dry ice was added thereto, and then the reaction mixture was stirred for additional 1 hour. Water (500 mL) was added while stirring and the adduct was filtered out and dried.

The formation of the carboxylic acid group of the carboxylated-carbon nanotube was identified by Infrared Spectral Analysis: $\upsilon_{C=O}$=1719 cm$^{-1}$.

Dried carboxylated-carbon nanotube (1.5 g) was dispersed into 500 mL of chlorobenzene, and 15 g of neodymium acetate was added thereto. The reaction mixture was refluxed while stirring. Acetic acid and water produced during the reaction were removed using a Dean-stark apparatus. Chlorobenzene was removed to produce neodymium-carbon nanotube.

The formation of the neodymium of the product was identified by Infrared Spectral Analysis: $\upsilon$(cm$^{-1}$)=1690.

Example

Preparation of Diene Polymers

Example 1

The neodymium-CNT (1.0% cyclohexane solution) prepared in Preparation Example 1, diethylaluminum chloride (1M cyclohexane solution), diisobutyl aluminum hydride (15% n-hexane solution), and triisobutyl aluminum (1M n-heptane solution) were added in the mole ratio of 1:10:5:3, respectively, where 3.0×10$^{-4}$ mol of the neodymium catalyst was used per 100 g of a monomer. Here, the weight ratio of solvent to monomer was 5.

After charging a 5-L pressure reactor with $N_2$ sufficiently, cyclohexane and the neodymium catalyst were added thereto and 400 g of butadiene was sequently added. The reaction mixture was reacted at 70 □ for 60 min.

Figure 4:
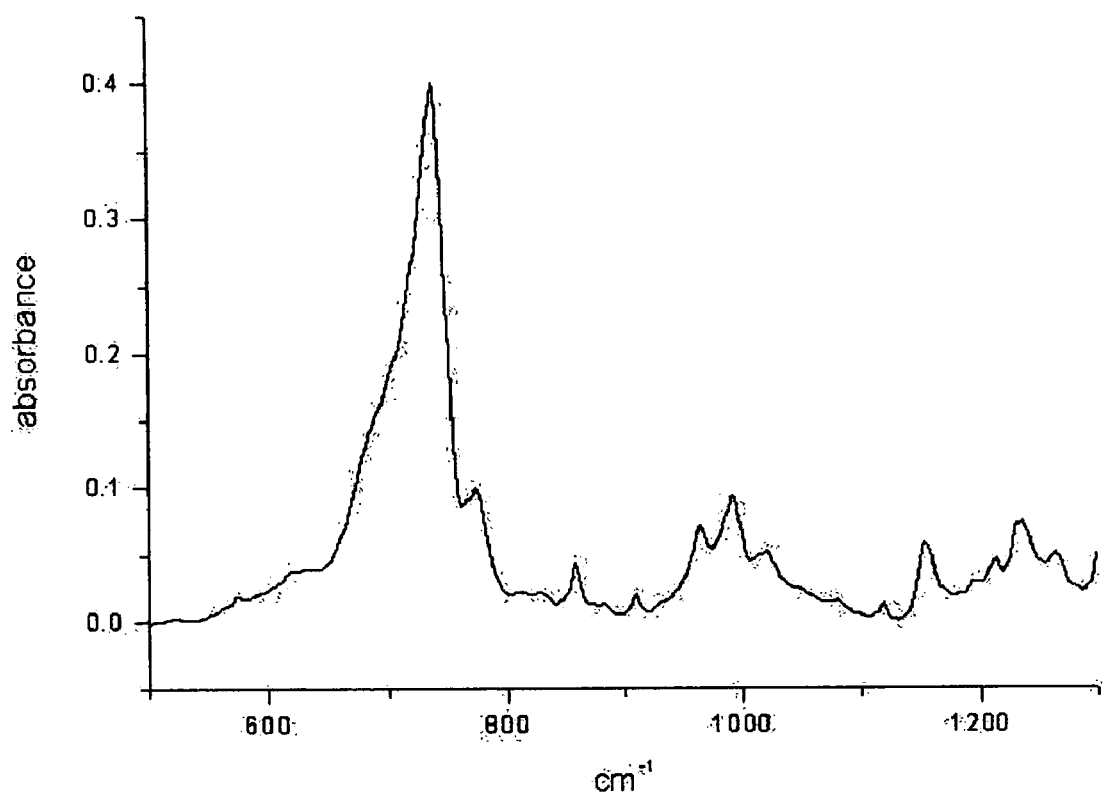
FIG. 4 is microstructural analysis data determined by the Infrared absorption spectra of polybutadiene prepared in Example 5 of the invention.
Figure 5:
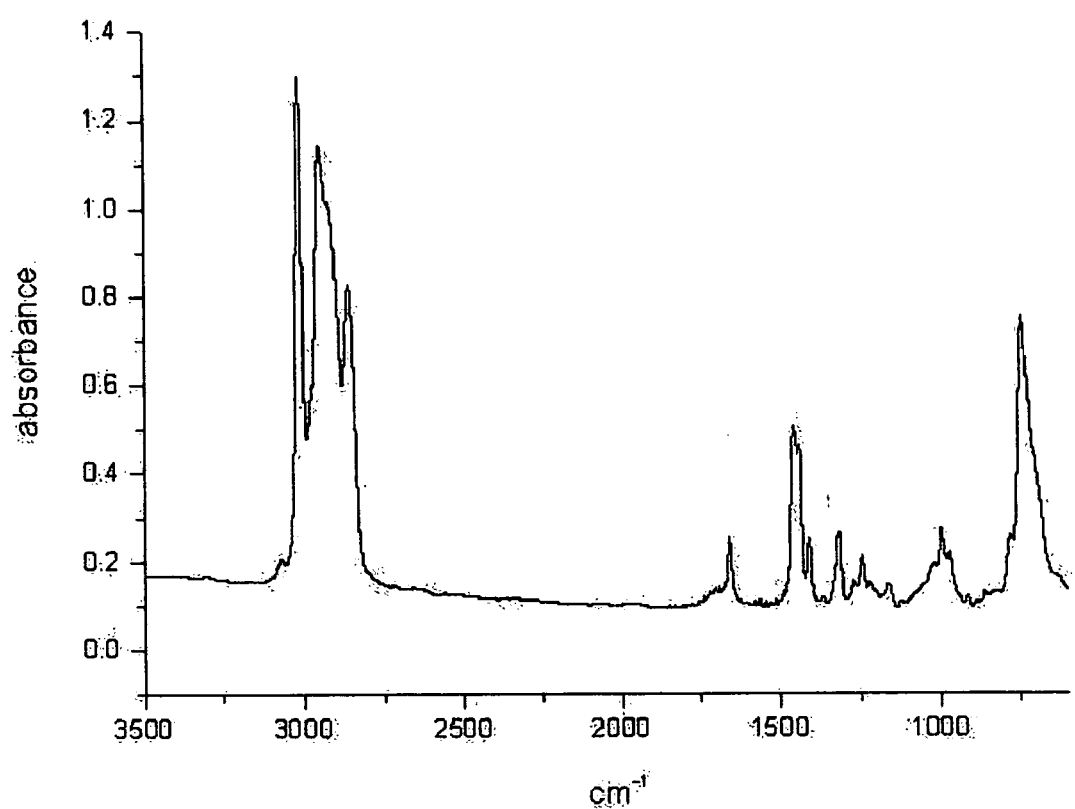
FIG. 5 is Infrared absorption spectrum of polybutadiene prepared in Example 1 of the invention.
Figure 6:
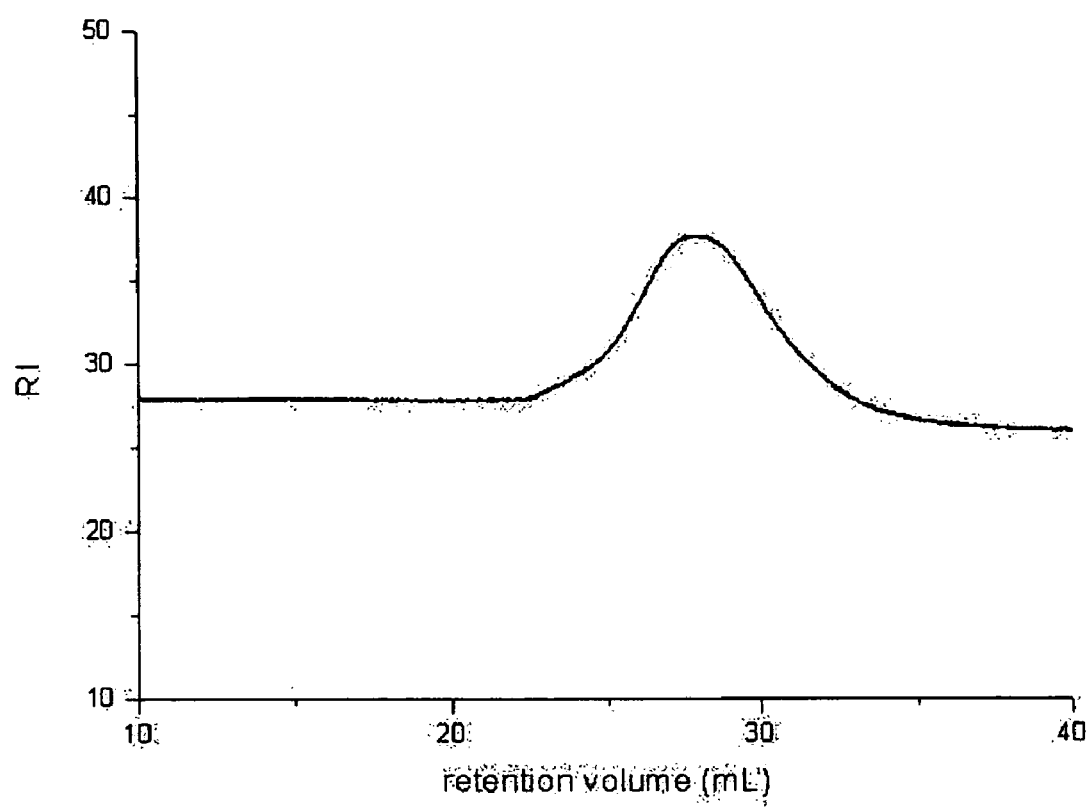
FIG. 6 is gel permeation chromatography of polybutadiene prepared in Example 1 of the invention.
Figure 7:
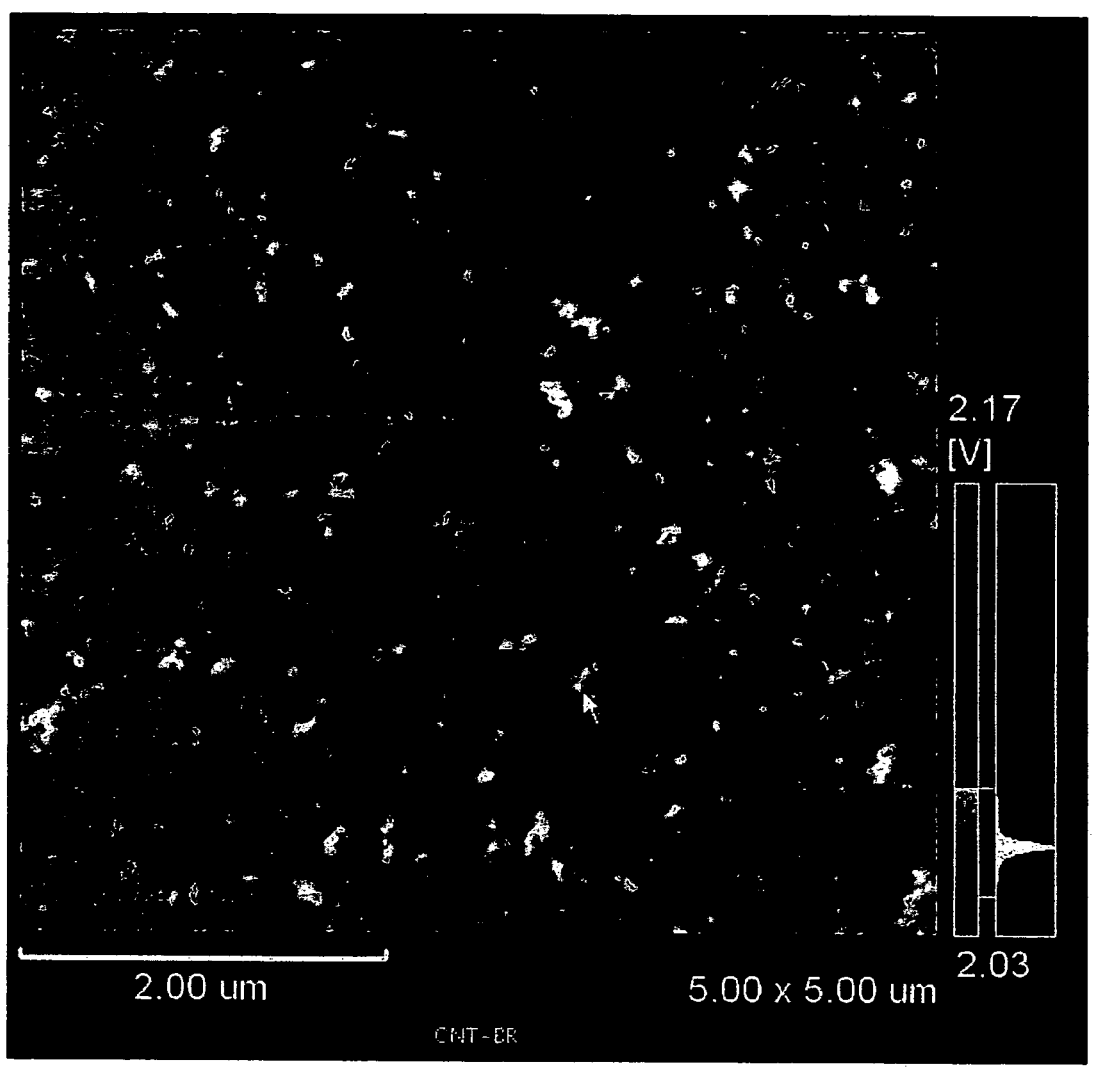
FIG. 7 is atomic force microscope image of CNT-polybutadiene prepared in Example 1 of the invention.

The microstructure of neodymium-CNT-catalyzed polybutadiene was identified by the Infrared absorption analysis as shown in FIGS. 4 and 5 and the gel permeation chromatogram was as shown in FIG. 6. The AFM (atomic force microscopy) image of neodymium-CNT-catalyzed polybutadiene was obtained by tapping mode (Resonance Frequency: 120 kHz) and shown in FIG. 7.

The procedure was performed using the same methods as described in Example 1, except for using neodymium-carbon nanotube(1% solution in cyclohexane, CNT 10%) prepared in Preparation Example 2. Microstructure, molecular weight, molecular weight distribution, Mooney viscosity, and solution viscosity of the polybutadiene were summarized in Table 1.

Example 3

The procedure was performed using the same method as described in Example 1, except for using neodymium-carbon nanotube(1% solution in cyclohexane, CNT 10%) prepared in Preparation Example 3. Microstructure, molecular weight, molecular weight distribution, Mooney viscosity, and solution viscosity of the polybutadiene were summarized in Table 1.

Example 4

The procedure was performed using the same method as described in Example 1, except for using neodymium-carbon nanotube(1% solution in cyclohexane, CNT 20%) prepared in Preparation Example 4. Microstructure, molecular weight, molecular weight distribution, Mooney viscosity, and solution viscosity the polybutadiene were summarized in Table 1.

Comparative Example 1

The procedure was performed using the same methods as described in Example 1, except for using neodymium versatate (1% solution in cyclohexane). Microstructure, molecular weight, molecular weight distribution, Mooney viscosity, and solution viscosity of the polybutadiene were summarized in Table 1.

Comparative Example 2

The procedure was performed using the same method as described in Example 1, except for adding 1.6 g of carbon nanotube into the solvent before the polymerization using neodymium versatate. Microstructure, molecular weight, molecular weight distribution, Mooney viscosity, and solution viscosity of the polybutadiene were summarized in Table 1.

Polymerization results and the analysis of polybutadiene are shown in Table 1. In Experiments 1 to 4, the following data are similar to those of comparative Exp 1 & 2: cis content of polybutadiene (higher than 97%), weight-average molecular weight (600000 to 950000), molecular weight distribution (2.5 to 3.5), Mooney viscosity (25 to 40), solution viscosity (120 to 370). The different results are shown in the area of conductivity and cold-flow. Conductivity of Experiments 1 to 4 is 10000 times higher than that of Comparative Example 1 due to their electrical conductivity. Cold-flow is lowered by one third due to entanglement effect of CNT. Although the polymer in Comparative Example 2 contains carbon nanotube, it is agglomerated, and shows little contribution in enhancing conductivity and in lowering cold-flow.

Figure 8:
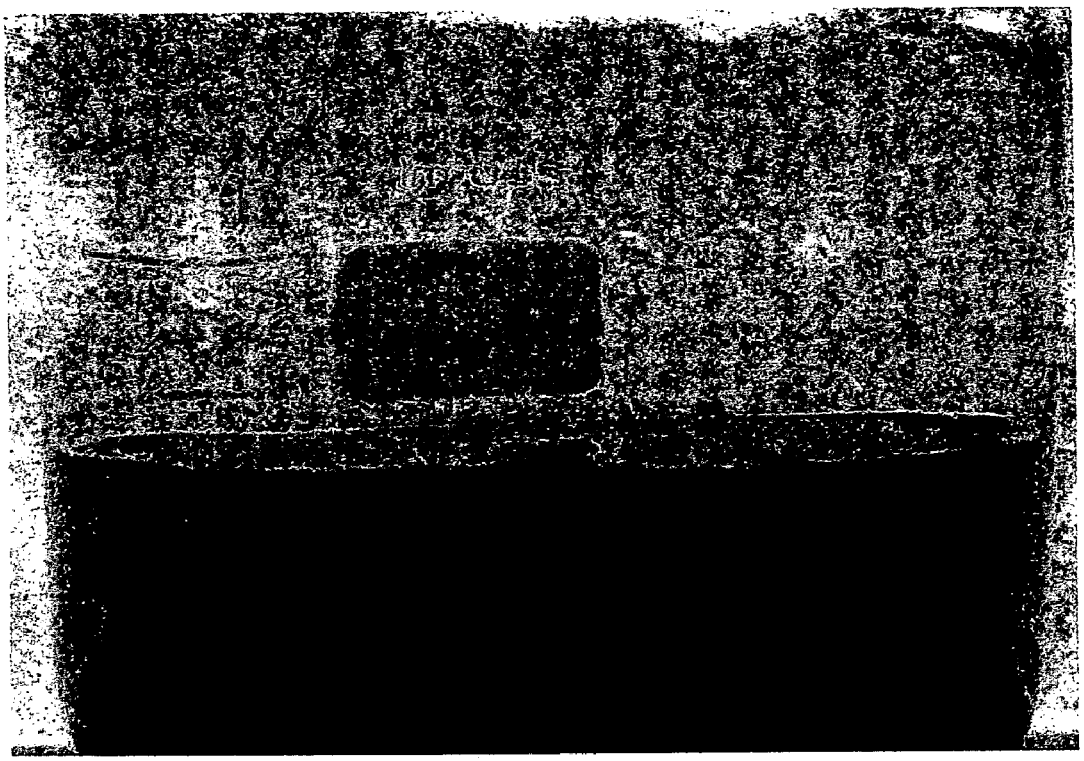
FIG. 8 is CNT-polybutadiene solution prepared in Example 1 of the invention.
Figure 9:
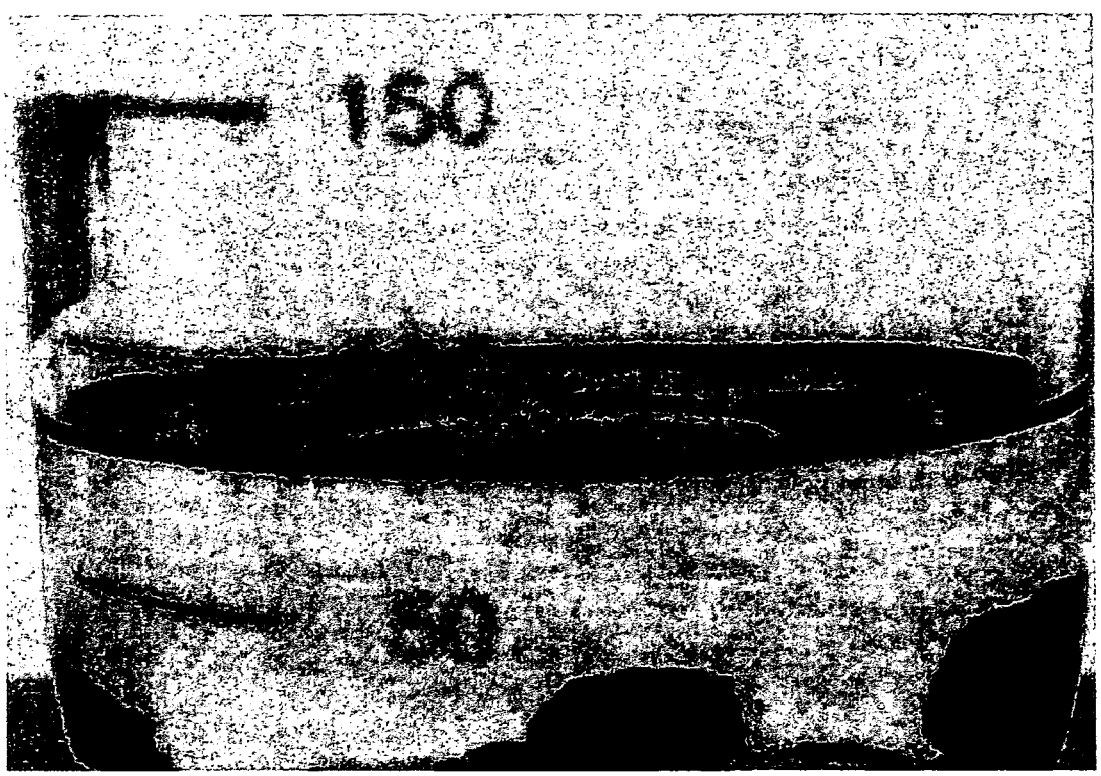
FIG. 9 is CNT-polybutadiene solution prepared in Comparative Example 2 of the invention.

FIGS. 8 and 9 are pictures of polybutadiene solutions prepared in Experiment 1 and Comparative Example 2, respectively. As a result, it is noted that carbon nanotube of Experiment 1 is homogeneously dispersed within the polymer, while the CNT of Comparative Examples 2 shows aggregation. Further, physical properties of Experiments 2 and 3 and Comparative Examples 1 and 2 are summarized in the following Table 2. The mechanical properties of the polymers of Examples 2 and 3 such as elasticity and durability are superior to those of Comparative Examples 1 and 2.

TABLE 2

| Test | Experiment 2 | Experiment 3 | Comparative Example 1 | Comparative Example 2 |
|---|---|---|---|---|
| MV (100 □) | 35.0 | 39.5 | 33.0 | 35.5 |
| 300%-Modulus (kgf/cm$^2$) | 121.6 | 129.5 | 106.5 | 101.4 |
| Tensile strength (kgf/cm$^2$) | 189.4 | 207.7 | 140.0 | 145.9 |
| Rebound (%) | 56.4 | 57.3 | 49.3 | 50.6 |
| Pico Abrasion (mg) | 12.9 | 12.5 | 17.8 | 17.0 |

INDUSTRIAL APPLICABILITY

As described above, when the catalyst containing a novel neodymium-carbon-nanotube according to the present

TABLE 1

| Category | Catalyst | amount (%) cis | trans | vinyl | Weight-average molecular weight (Mw) | Molecular weight distribution (MWD) | Mooney viscosity (ML$_{1+4}$, 100 □) | Solution viscosity (5.3%, 25 □) | Conductivity (S/cm) | Cold flow (mg/min) |
|---|---|---|---|---|---|---|---|---|---|---|
| Exp. 1 | Nd-CNT | 97.6 | 1.8 | 0.6 | 609000 | 3.31 | 29.5 | 128 | $3.6 \times 10^{-9}$ | 0.7 |
| Exp. 2 | Nd-CNT | 98.2 | 1.4 | 0.4 | 867000 | 2.66 | 35.0 | 217 | $7.9 \times 10^{-8}$ | 0.6 |
| Exp. 3 | Nd-CNT | 98.6 | 1.1 | 0.3 | 923000 | 2.80 | 39.5 | 355 | $2.1 \times 10^{-7}$ | 0.5 |
| Exp. 4 | Nd-CNT | 98.4 | 1.2 | 0.4 | 653000 | 3.28 | 27.5 | 289 | $1.1 \times 10^{-8}$ | 0.9 |
| Com. Ex. 1 | NdHV4 | 98.0 | 1.5 | 0.5 | 712000 | 2.59 | 33.0 | 298 | $1.5 \times 10^{-15}$ | 2.9 |
| Com. Ex. 2 | NdHV4 | 98.3 | 1.7 | 0.6 | 799000 | 2.79 | 35.5 | 327 | $7.3 \times 10^{-14}$ | 2.5 | invention is used in the polymerization of butadiene, it provides high 1,4-cis polybutadiene having low cold flow and high electrical conductivity and having a 1,4-cis content of at least 95%. The polybutadiene containing dispersed CNT will be used in silica compounding application due to high conductivity.

Those skilled in the art will appreciate that the conceptions and specific embodiments disclosed in the foregoing description may be readily utilized as a basis for modifying or designing other embodiments for carrying out the same purposes of the present invention.

What is claimed is:

1. A neodymium-carbon nanotube expressed by the following formula 1, $$Nd_x(CNT)(A)_y \cdot (HA)_q \quad (1)$$

wherein A is carboxylate having 8 to 20 carbon atoms, HA is carboxylic acid, CNT is carbon nanotube, y=3x, and $0 \leq q/x \leq 10$.

2. The neodymium-carbon nanotube of claim 1, wherein said A is selected from the group consisting of neodeconoate, octanoate, stearate, and naphthenate.

3. A catalyst for diene polymerization comprising:
   (1) a neodymium-carbon nanotube expressed by the following formula 1;
   (2) a halogen compound expressed by the following formula 2; and
   (3) an organometallic or inorganic compound expressed by the following formula 3, $$Nd_x(CNT)(A)_y \cdot (HA)_q \quad (1)$$

wherein A is carboxylate having 8 to 20 carbon atoms, HA is carboxylic acid, CNT is carbon nanotube, y=3x, and $0 \leq q/x \leq 10$;

$$(R_1)_n AlX_{3-n} \quad (2)$$

wherein $R_1$ is an alkyl, aryl of from 1 to 10 carbon atoms or a hydrogen, X is a halogen, and n is an integer of 1 or 2; and $$M(R_2)_r \quad (3)$$

wherein $R_2$ is an alkyl, cycloalkyl, aryl, arylalkyl, alkoxy of from 1 to 10 carbon atoms or a hydrogen, M is a metal atom selected from Al, Mg, and Li, and $1 \leq r \leq 3$.

4. The catalyst for the diene polymerization of claim 3, wherein 1 to 20 moles of said halogen compound is used based on 1 mole of the neodymium atom.

5. The catalyst for the diene polymerization of claim 3, wherein 20 to 100 moles of said organometallic or inorganic compound is used based on 1 mole of neodymium atom.

6. A method for preparing polydienes having a high 1,4-cis content using any catalyst of claim 3 in the polymerization of diene compounds in the presents of a non-polar solvent.

* * * * *